INDUCTIVELY RESET CARRIER MAGNETIC AMPLIFIER

Filed Dec. 15, 1954

INVENTOR
RICHARD W. SPENCER

BY [signature]
ATTORNEY

United States Patent Office 2,886,658

Patented May 12, 1959

2,886,658

INDUCTIVELY RESET CARRIER MAGNETIC AMPLIFIER

Richard W. Spencer, Philadelphia, Pa., assignor to Sperry Rand Corporation, New York, N.Y., a corporation of Delaware Application December 15, 1954, Serial No. 475,479

19 Claims. (Cl. 179—171)

The present invention relates to magnetic amplifiers and is more particularly concerned with an improved carrier type magnetic amplifier. In particular, the present invention relates to single-ended carrier type magnetic amplifier structures which exhibit operational advantages heretofore restricted to double-ended magnetic amplifier operation.

Carrier type magnetic amplifiers have in the past taken several possible basic forms of construction. One of the most useful types, where a component of output at signal frequency is required, is the series self-saturating type. In this type, plural cores may be provided and the load current flows through a diode in series with one winding on each core, and thereby aids the signal in saturating the core. One or more cores may be used, each coupled to a separate source of carrier voltage and to a common load. The carrier voltages are generally so phased that the intervals between the starts of conduction of successive core windings are equal. Thus, there are half-wave (single-core), full-wave (two-core) and three phase (three-core) amplifiers. The full-wave type and polyphase types have certain advantages over the single-core type. These are described, in the case of the full-wave type, below.

In double-ended magnetic amplifiers, a pair of magnetic cores are normally utilized, each of which carries a power winding thereon. The two power windings of such a double-ended (two-core) magnetic amplifier device are coupled respectively at one of their ends to sources of alternating carrier potential which sources are respectively 180° out of phase; and the other ends of the said power windings are coupled to a load device. The two cores further carry either a single common signal winding or separate signal windings connected in series with one another, and the said signal winding or windings are in turn selectively energized by a signal source.

In operation, the cores of such a two-core self-saturating carrier type magnetic amplifier are caused to traverse their respective hysteresis loops by application of the said carrier potential in conjunction with the operation of preselected bias potentials included in the said signal source, and the traverse is so effected that, at minimum output, when one of the said cores is at its minus remanence operating point the other of the said cores is at its plus remanence operating point. As a result of this operation, each one of the said cores is alternately in such an operating condition that it tends to reset the other of the said cores through the signal windings discussed previously. Thus, the resetting of the cores in the two-core self-saturating magnetic amplifier need not be done entirely by the signal and bias sources coupled to the signal winding or windings of the amplifier, and further, potentials at the carrier frequency tend to cancel in the signal winding or windings of the amplifier.

These operational features have in the past resulted in at least two distinct advantages thought to be characteristic of two-core and polyphase magnetic amplifiers only, and these advantages are (*a*) the choice of a wide range of rise times with a nearly constant ratio of power gain to rise time, provided an appropriate input impedance was provided; and (*b*) the elimination of large amplitude carrier frequency voltages induced in the signal windings of the amplifier.

Single-ended magnetic amplifiers have in the past exhibited substantially poorer operation than two-core magnetic amplifiers, and this poorer operation has been considered to be inherent in the construction of such a single-ended magnetic amplifier, primarily because the resetting of the amplifier core has had to be effected entirely by signal and bias sources coupled to windings on the said core.

The present invention provides a novel structure whereby a single-ended carrier type magnetic amplifier may approach the characteristics of a two-core self-saturating magnetic amplifier, and in particular, this improved operation is effected by providing inductive reset means coupled to the amplifier whereby resetting of the core no longer need be done entirely by signal and bias sources.

It is accordingly an object of the present invention to provide an improved carrier type magnetic amplifier.

A further object of the present invention resides in the provision of a single-ended carrier type magnetic amplifier exhibiting operational characteristics approaching that of a two-core self-saturating magnetic amplifier.

Another object of the present invention resides in the provision of a single-ended carrier type magnetic amplifier which need not depend entirely upon signal and bias sources for resetting of the core.

A still further object of the present invention resides in the provision of a single-ended carrier type magnetic amplifier having a wide range of rise times with a nearly constant ratio of power gain to rise time.

A further object of the present invention resides in the provision of a single-ended carrier type magnetic amplifier having auxiliary reset means whereby the resetting functions of signal and bias sources coupled to windings on the said amplifier may be aided.

The foregoing objects, advantages, construction and operation of the present invention will become more readily apparent from the following description and accompanying drawings, in which.

Figure 1:
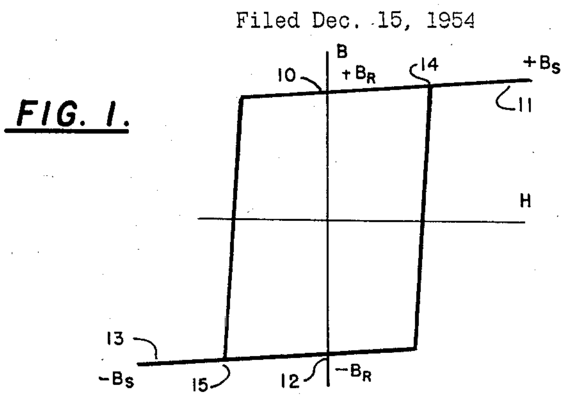
Figure 1 illustrates an idealized hysteresis loop of a magnetic material such as may be utilized in the cores of magnetic amplifiers constructed in accordance with the present invention.

Referring now to the hysteresis loop shown in Figure 1, the operation of magnetic amplifiers in accordance with the present invention may readily be seen. Such magnetic amplifiers may preferably but not necessarily utilize magnetic cores exhibiting a substantially rectangular hysteresis loop, and these cores may be made of a variety of materials, among which are the various types of ferrites and various kinds of magnetic tapes, including Orthonik and 4–79 Molypermalloy. These materials may further be given different heat treatments to effect different desired properties. In addition to the wide variety of materials applicable, the cores of the magnetic amplifiers to be discussed may be constructed in a number of different geometries, including both closed and open paths. For example, cup-shaped cores, strips of material, or toroidal cores may be used. It must be emphasized, however, that the present invention is not limited to any specific geometries of its cores nor to any specific hysteretic configuration therefor, and the examples to be given are illustrative only.

Referring now to the hysteresis loop shown in Figure 1, it will be noted that the curve exhibits several significant points of operation, namely, point 10 (+B*r*) which represents a point of plus remanence; the point 11 (+B*s*) which represents a point of plus saturation; the point 12 (−B*r*) which represents minus remanence; the point 13 (−B*s*) which represents minus saturation; the point 14 which represents the beginning of the plus saturation region; and the point 15 which represents the beginning of the minus saturation region. Discussing for the moment the operation of a device utilizing a core which exhibits a hysteresis loop such as has been shown in Figure 1, let us initially assume that a coil is wound on the said core. If the core should be at its operating point 10 (plus remanence), and if a voltage pulse should be applied to the said coil, which pulse produces a current creating a magnetomotive force in a direction tending to increase the flux in the said core (i.e. in a direction of +H), the core will tend to be driven from the said operating point 10 (+B*r*) to the region of its operating point 11 (+B*s*). During this state of operation there is relatively little flux change through the said core and the coil therefore presents a relatively low impedance whereby energy fed to the said coil during this state of operation will pass readily therethrough and may be utilized to effect a usable output.

On the other hand, if the magnetic core should be initially at an operating point 12 (−B*r*) prior to the application of the voltage pulse discussed previously, upon application of such a pulse the core will tend to be driven from the said point 12 to the region of plus saturation. The pulse magnitude should preferably be so selected that the core is driven only to the beginning of the plus saturation region, namely, to point 14. During this particular state of operation there is a very large flux change through the said core and the coil therefore exhibits a relatively high impedance to the applied pulse. As a result the current is small and substantially all the voltage applied to the coil, when the core is initially at its −B*r* operating point 12, will appear across the coil thereby "flipping" the core from the said operating point 12, preferably to the operating point 14, and thence to the operating point 10, with very little energy actually passing through the said coil to give a useful output. Thus, depending upon whether the core is initially at point 10 (+B*r*) or point 12 (−B*r*), an applied pulse in the +H direction will be presented respectively with either a low impedance or a high impedance, and will effect either a relatively large output or a relatively small output. These considerations are of value in the construction of single-ended carrier type magnetic amplifiers in accordance with the present invention.

Figure 2:
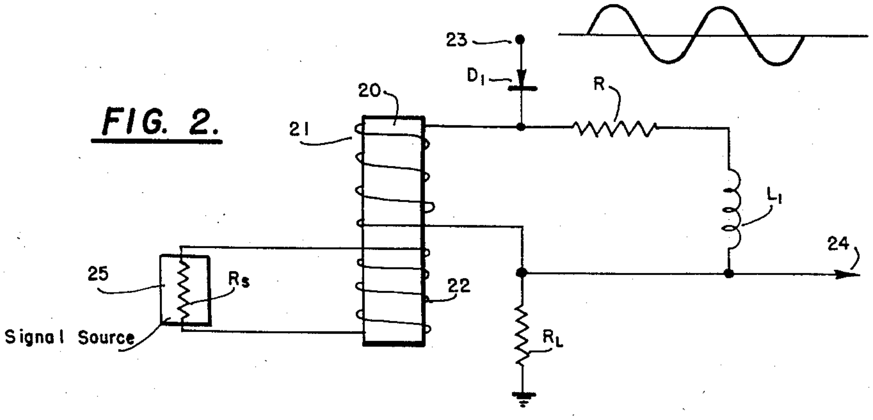
Figure 2 is a schematic diagram of a simple single-ended carrier type magnetic amplifier constructed in accordance with the present invention.

Referring now to Figure 2, it will be seen that such a single-ended carrier type magnetic amplifier may comprise a core 20 of magnetic material, preferably but not necessarily exhibiting a hysteresis loop substantially similar to that discussed in reference to Figure 1. Core 20 carries two windings thereon, namely, a winding 21 which is termed a power or output winding and a winding 22 termed a signal or input winding. One end of the said power or output winding 21 is coupled via a rectifier D1 to a source 23 of carrier potential and the said source 23 may in fact exhibit a sinusoidal, rectangular, or other alternating waveform. The lower end of the said power winding 21 is coupled to a load impedance $R_L$ whereby an output may be selectively taken across the said impedance $R_L$ at an output point 24. Signal or input winding 22 is coupled as shown to a signal source 25, exhibiting an internal impedance $R_S$ and the said signal source 25, in practice, ordinarily includes a source of bias potential (not shown) which may, if desired, be a D.C. source in series with the signal source.

In operation, an amplifier such as has been illustrated in Figure 2 may be either complementing or non-complementing in operation, and in this respect a complementing amplifier is defined as one which effects a signal output in the absence of a signal input only; while a non-complementing magnetic amplifier is defined as one which effects a signal output only in response to the presence of a signal input. When single-ended carrier type magnetic amplifiers of the type shown in Figure 2 are constructed to effect complementing operation, each positive-going half-cycle of applied carrier potential from the source 23 effects a current flow through the power or output winding 21, which current flow tends to drive the core 20 from its operating point 10 (+B*r*) to its operating point 11 (+B*s*). Inasmuch as such operation of the core 20 corresponds to a low impedance state of the coil 21, a major portion of the voltage appearing in successive positive half-cycles of the applied carrier potential is caused to appear across the load impedance $R_L$.

If a resultant signal should, however, appear across the input winding 22 from the signal source 25 during a negative half-cycle of applied carrier potential from the source 23, the signal so applied will tend to reset the core 20 from its plus remanence operating point 10 to its minus remanence operating point 12, via the operating point 15, and this resetting effect of the applied signal will reduce the output appearing at terminal 24. The bias source included in signal source 25 may in fact be so chosen that the core 20 tends to be reset during each applied negative half-cycle of carrier potential, or a further source of reverse current flow may be coupled to the power or output winding 21 to effect this resetting function. When the device is in fact reset successively by a bias source included in the signal source 25, or by an auxiliary bias source coupled to the winding 21, the amplifier is non-complementing in operation and the core 20 is caused merely to traverse its hysteresis loop in the absence of a signal input from the source 25 tending to overcome the resetting function of the said bias source or sources.

In general, such single-ended magnetic amplifiers depend entirely upon one or more bias sources or upon the signal source itself for resetting the core to effect proper complementing or non-complementing operation, and this dependence results in the disadvantages discussed previously, and heretofore thought to be inherent in the operation of single-ended carrier type magnetic amplifiers. In accordance with the present invention, however, an inductance $L_1$ is coupled across the power or output winding 21, and in the particular example shown in Figure 2, the said inductane may in fact be connected in series with a resistance R across the said winding 21. In operation, and at minimum output, the magnetic core 20 is caused to traverse its entire major hysteresis loop or an appreciable portion thereof in accordance with the preceding discussion. During each positive-going half-cycle of applied carrier potential from the source 23, current flows via the rectifier D1 to both the winding 21 and, via the resistor R, to the inductance $L_1$. During such positive-going half-cycles of the applied carrier potential the current thus flowing from the upper end to the lower end of the power or output winding 21 causes the magnetic amplifier shown to operate in accordance with the preceding discussion. During negative half-cycles of applied carrier potential, however, the rectifier D1 is cut off, and inasmuch as energy was stored in the inductance $L_1$ during the next preceding positive-going half-cycle, the said inductance $L_1$ tends to act as a source during the applied negative half-cycle of carrier potential and effects a current flow through the said winding 21 in a direction reverse to that caused by the applied positive-going half-cycle of carrier potential. Thus, the provision of the inductance $L_1$ causes the core 20 to be partially reset during the application of negative going half-cycles of applied carrier potential whereby the operation of the amplifier is no longer dependent entirely upon signal or bias sources for effecting a desired reset.

In practice, the inductance $L_1$ should have a value of the order of magnitude of:

$$\frac{\int edt}{I_m}$$

where $\int edt$ is the voltage time integral to "flip" the core, and $I_m$ is the magnetizing current at the operating frequency, each being referred to the power winding 21. The term "magnetizing current" used above, and hereinafter, is well known to those skilled in the art; and attention is invited to the Standard Handbook for Electrical Engineers, 6th edition (1933), section 2–99 for a full discussion thereof. The resistor R shown serves to reduce the D.C. component of current flowing in the inductance $L_1$. This resistance R may in fact be negligibly small, or even totally unnecessary, depending upon the nature of the carrier wave potential. The internal impedance $R_S$ of the signal source 25 may be relatively large to oppose the flow of current due to carrier frequency potentials induced in the input circuit. Reduction of the current flow due to induced carrier frequency potentials may further be effected by providing a low pass or band pass filter in series with the signal source 25, inasmuch as the frequency of the signals appearing from the said signal source 25 are much lower than the frequency of carrier wave potential applied from the source 23. It should further be noted that due to the provision of the inductance $L_1$, the bias currents (and therefore the signal current) can be substantially smaller than in similar circuits not using the inductance $L_1$. This latter circumstance follows inasmuch as the said inductance $L_1$ partially resets the core 20, except when the said core 20 is at saturation (the maximum output state), at which time there is little if any voltage across the said inductance $L_1$.

Figure 3:
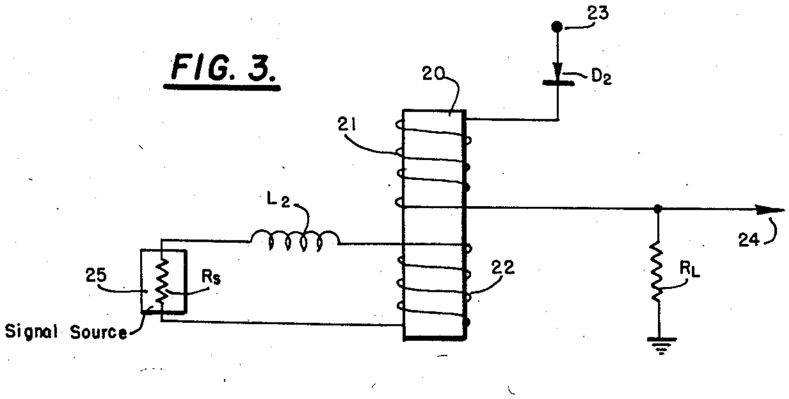
Figure 3 is a schematic diagram of a simple single-ended carrier type magnetic amplifier constructed in accordance with a modification of the present invention.

The advantages discussed previously may further be effected as is shown in Figure 3, by placing an inductance $L_2$ in series with the signal or input winding 22, rather than in parallel with the power or output winding 21. The same considerations apply in respect to the operation of the circuit shown in Figure 3, except that by inserting the inductance $L_2$ in series with the signal source 25, voltages induced across the said inductance subtract from that across the control winding 22, thus permitting the use of a low impedance signal source 25. The value of the inductance 22 should be, as before, approximately:

$$\frac{\int edt}{I_m}$$

except that now the $\int edt$ and $I_m$ are values each referred to the input winding 22 rather than to the power or output winding 21.

While I have described preferred embodiments of the present invention, it must be understood that the foregoing description is meant to be illustrative only and is not limitative of my invention. Many variations will be suggested to those skilled in the art, and such variations as are in accord with the principles discussed previously, are meant to fall within the scope of the present invention as set forth in the appended claims.

Having thus described my invention, I claim:

1. A self-saturating carrier type magnetic amplifier comprising a single core of magnetic material, a first winding on said core, rectifier means coupling a source of alternating carrier potential to said first winding whereby carrier potential excursions of a preselected polarity only effect current flow in said first winding, a second winding on said single core, a source of signals selectively coupled to said second winding, said signals being of a frequency substantially less than that of said alternating carrier potential, and inductive storage means remote from said single core and coupled to at least one of said first and second windings for storing energy during the said carrier potential excursions of said preselected polarity, said inductive storage means being arranged to discharge energy stored therein into its associated amplifier winding during carrier potential excursions of a polarity opposite said preselected polarity whereby said core is at least partially reset from a given hysteretic operating point by discharge of said stored energy during said opposite polarity carrier potential excursions.

2. The amplifier of claim 1 wherein said inductive storage means is connected in parallel with said first winding.

3. The amplifier of claim 2 wherein said inductive storage means comprises a series connected resistor and inductor.

4. The amplifier of claim 1 wherein said inductive storage means comprises an inductance interposed between said source of signals and said second winding.

5. The amplifier of claim 1 wherein said core comprises a magnetic material exhibiting a substantially rectangular hysteresis loop.

6. A single core carrier type magnetic amplifier comprising a single core of magnetic material having first and second windings thereon, a source of alternating carrier potential, rectifier means coupling said source of carrier potential to one end of said first winding, load means coupled to the other end of said first winding, a source of control signals coupled selectively to said second winding, and inductive means remote from said single core and coupled to at least one of said first and second windings for storing energy during first polarity excursions of said carrier source and for discharging said stored energy into its associated amplifier winding during opposite polarity excursions of said carrier source, whereby said energy discharge tends to reset said core from its remanent operating points toward the other of its remanent operating points.

7. The amplifier of claim 6 wherein said inductive means comprises an inductor connected across said first winding between said rectifier means and said load means.

8. The amplifier of claim 6 wherein said inductive means comprises an inductor connected between one terminal of said source of control signals and one end of said second winding.

9. The amplifier of claim 8 wherein said source of control signals is a low impedance source.

10. A single core carrier type magnetic amplifier comprising a single core of magnetic material having first and second windings thereon, a source of alternating carrier potential coupled to one end of said first winding, an inductance remote from said core and connected across said first winding whereby said inductance is also connected to said source of carrier potential, said inductance being operative to store energy during half cycles of said carrier potential of a selected polarity and to discharge said energy through said first winding during half cycles of said carrier potential of the opposite polarity, and a source of selective control signals coupled to the said second winding.

11. The magnetic amplifier of claim 10 wherein said core has two remanent operating points of opposite polarity respectively, said inductance having a value of the order of magnitude $\int edt/I_m$, where $\int edt$ is the voltage-time integral required to drive said core from one of its remanent operating points to the other of its remanent operating points and $I_m$ is the magnetizing current at the frequency of said carrier potential, the values $\int edt$ and $I_m$ being referred to said first winding.

12. The magnetic amplifier of claim 10 including a diode between said carrier source and said one end of said first winding, said diode having its anode connected to said source of alternating carrier potential and having its cathode connected to one end of said first winding.

13. The amplifier of claim 10 wherein said core comprises a magnetic material exhibiting a substantially rectangular hysteresis loop.

14. A single core carrier type magnetic amplifier comprising a core of magnetic material having a first winding thereon, an inductance remote from said core and connected in parallel with said first winding, a source of alternating carrier potential coupled via rectifier means to one end of said parallel connected inductance and first winding whereby first polarity excursions of said source render said rectifier means conductive to effect current flow in a first direction through both said first winding and inductance, and second opposite polarity excursions of said source render said rectifier means nonconductive whereby said inductance acts as a current storage source, during said second polarity excursions, to effect current flow through said first winding in a second direction opopsite to said first direction, a second winding on said core, and means for selectively effecting current flow in said second winding whereby said second winding effects a magnetomotive force in said core coincident with the occurrence of the magnetomotive force produced by said current flow in said second direction through said first winding.

15. The combination of claim 14 wherein the current flow in said second winding is in such direction as to produce a magnetomotive force in said core having the same polarity as that of the magnetomotive force produced by said current flow in said second direction through said first winding, whereby said first and second windings produce aiding magnetomotive forces to reset said core from one to another magnetic operating point during said second polarity excursions of said source.

16. The combination of claim 14 including load means coupled to the other end of said parallel connected inductance and first winding.

17. A single core carrier type magnetic amplifier comprising a single core of magnetic material having first and second preselected magnetic operating points, first and second windings on said core, a source of carrier potential coupled to said first winding whereby first polarity excursions of said carrier source effect first magnetomotive forces in said core, an inductance remote from said single core and coupled to one of said first and second windings for storing energy during said first polarity excursions, said inductance being operative to discharge current through said one winding during second opposite polarity excursions of said carrier source thereby to effect second magnetomotive forces in said core having a polarity opposite to that of said first magnetomotive forces, and a signal source for selectively effecting current flow through said second winding thereby to effect third magnetomotive forces in said core having the same polarity as that of said second magnetomotive forces, the magnitude of said third magnetomotive forces being alone insufficient to move said core between its said first and second operating points, said second and third aiding magnetomotive forces producing a resultant magnetomotive force having a magnitude sufficient to move said core between its said first and second operating points during said second opposite polarity excursions of said carrier source.

18. The combination of claim 17 wherein said inductance is connected in parallel with said first winding, said carrier source being coupled via rectifier means to one end of said parallel connected first winding and inductance, and load means coupled to the other end of said parallel connected first winding and inductance.

19. A single core carrier type magnetic amplifier comprising a single core of magnetic material having first and second remanent operating points, winding means on said core, a source of carrier potential coupled via rectifier means to said winding means whereby first polarity excursions of said carrier source effect first magnetomotive forces in said core, storage means coupled to said winding means and to said carrier source for storing energy during said first polarity excursions, said storage means being operative to discharge current through said winding means during second opposite polarity excursions of said carrier source thereby to effect second magnetomotive forces in said core having a polarity opposite to that of said first magnetomotive forces, and signal control means for selectively effecting current flow through said winding means thereby to effect third magnetomotive forces in said core having the same polarity as that of said second magnetomotive forces, the magnitude of said third magnetomotive forces being alone insufficient to move said core between its said remanent operating points, said second and third aiding magnetomotive forces producing a resultant magnetomotive force having a magnitude sufficient to move said core between its said remanent operating points during said second opposite polarity excursions of said carrier source.

References Cited in the file of this patent

UNITED STATES PATENTS

| | | |
|---|---|---|
| 1,739,579 | Dowling | Dec. 17, 1929 |
| 2,222,049 | Stevens et al. | Nov. 19, 1940 |
| 2,554,203 | Morgan | May 22, 1951 |
| 2,710,313 | Logan | June 7, 1955 |
| 2,734,165 | Lufcy et al. | Feb. 7, 1956 |
| 2,758,161 | Jackson | Aug. 7, 1956 |
| 2,777,021 | Walker | Jan. 8, 1957 |

OTHER REFERENCES

Electronics, September 1948, pp. 88–93 (particularly Figs. 3 and 4), Transductor Fundamentals, by Hedstroem and Borg.

UNITED STATES PATENT OFFICE
CERTIFICATE OF CORRECTION

May 12, 1959

Patent No. 2,886,658

Richard W. Spencer

It is hereby certified that error appears in the printed specification of the above numbered patent requiring correction and that the said Letters Patent should read as corrected below.

Column 6, line 39, for "from its" read -- from one of its --; column 7, line 20, for "opopsite to said" read -- opposite to said --.

Signed and sealed this 29th day of September 1959.

(SEAL)
Attest:

KARL H. AXLINE
Attesting Officer

ROBERT C. WATSON
Commissioner of Patents